US009361164B2

(12) United States Patent
Kubo

(10) Patent No.: US 9,361,164 B2
(45) Date of Patent: Jun. 7, 2016

(54) EVENT MANAGEMENT APPARATUS AND METHOD

(71) Applicant: FUJITSU LIMITED, Kawasaki-shi, Kanagawa (JP)

(72) Inventor: Hayato Kubo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 43 days.

(21) Appl. No.: 14/327,588

(22) Filed: Jul. 10, 2014

(65) Prior Publication Data

US 2014/0325529 A1 Oct. 30, 2014

Related U.S. Application Data

(63) Continuation of application No. PCT/JP2012/052426, filed on Feb. 2, 2012.

(51) Int. Cl.
*G06F 9/54* (2006.01)
*G06F 11/34* (2006.01)

(52) U.S. Cl.
CPC ............ *G06F 9/542* (2013.01); *G06F 11/3476* (2013.01); *G06F 2201/86* (2013.01)

(58) Field of Classification Search
CPC .................................................... G06F 9/542
See application file for complete search history.

(56) References Cited

U.S. PATENT DOCUMENTS 7,512,680 B2 3/2009 Nishikawa et al.
7,539,974 B2* 5/2009 Beck .................... G06F 9/542
717/117
2011/0145934 A1* 6/2011 Abramovici et al. ........... 726/30
2011/0208884 A1 8/2011 Horihata

FOREIGN PATENT DOCUMENTS

| JP | 60-142696 | 7/1985 |
| JP | 09-160791 | 6/1997 |
| JP | 2005-251048 A | 9/2005 |
| JP | 2007-519075 A | 7/2007 |
| JP | 2009-020736 A | 1/2009 |
| WO | 2005/045739 A2 | 5/2005 |
| WO | 2010/052892 A1 | 5/2010 |

OTHER PUBLICATIONS

International Search Report issued on Mar. 13, 2012 for PCT/JP2012/052426 filed on Feb. 2, 2012 in English.
Office Action mailed Oct. 20, 2015 in Japanese Patent Application No. 2013-556159 (with English Translation).

* cited by examiner

*Primary Examiner* — H S Sough
*Assistant Examiner* — Kimberly Jordan
(74) *Attorney, Agent, or Firm* — Oblon, McClelland, Maier & Neustadt, L.L.P

(57) ABSTRACT

A present event management method includes: calculating, for each of plural execution intervals that are different each other, a number of events to be executed within a predetermined interval that is equal to or less than a shortest execution interval; reading n data blocks at the predetermined intervals from a storage device that stores, for each of plural events, a data block. "n" is a total number of calculated numbers. The data block is used to execute a corresponding event, and each of the plural events has either of the plural execution intervals. The present event management method further includes outputting an execution request including the read data blocks to an execution unit that executes an event.

4 Claims, 14 Drawing Sheets

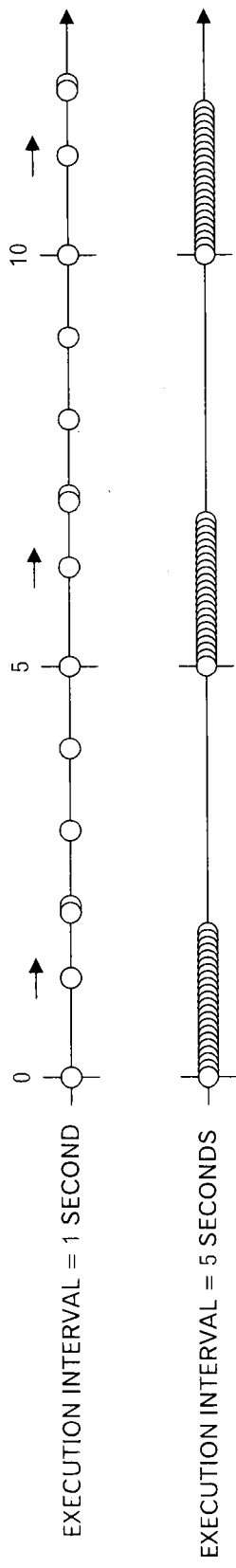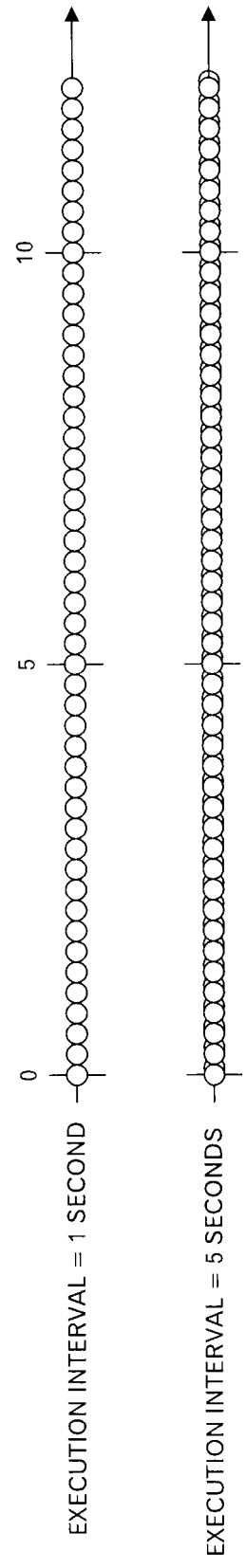

| SERVER | STATE | EVENT TABLE |
|---|---|---|
| 0 | ON | 0 |
| 1 | ON | 1 |
| ⋮ | ⋮ | ⋮ |
| 37 | OFF | 37 |

| FUNCTION NAME | COUNTER | EXECUTION INTERVAL | SENSOR LIST |
|---|---|---|---|
| GetXXX | 1 | 1 | 1 |
| GetYYY | 3 | 5 | 2 |
| GetZZZ | 8 | 10 | 3 |

| EXECUTION INTERVAL | NO. OF EVENTS | NO. OF READ OPERATIONS TO BE PERFORMED |
|---|---|---|
| 5 | 610 | 3 |

| EXECUTION INTERVAL (SEC) | NO. OF TARGETS TO BE MONITORED | NO. OF TARGETS TO BE MONITORED PER 1 SECOND |
|---|---|---|
| 1 | 5 | 5 |
| 5 | 3136 | 627.2 |
| 10 | 1390 | 139 |
| 20 | 661 | 33.05 |
| 60 | 2072 | 34.53 |
| 200 | 38 | 0.19 |
| 600 | 38 | 0.063 |
| TOTAL | 7302 | 839.033 |

| SERVER | VOLTAGE | POWER SUPPLY | TEMPERATURE | ... |
|---|---|---|---|---|
| 1 | a | b | c | ... |
| 2 | d | e | f | ... |
| 3 | g | h | i | ... |
| ⋮ | ⋮ | ⋮ | ⋮ | |

EVENT MANAGEMENT APPARATUS AND METHOD

CROSS-REFERENCE TO RELATED APPLICATIONS

This application is a continuing application, filed under 35 U.S.C. section 111(a), of International Application PCT/JP2012/052426, filed on Feb. 2, 2012, the entire contents of which are incorporated herein by reference.

FIELD

This technique relates to a technique for managing executions of events.

BACKGROUND

In a system that monitors apparatuses, an event is periodically executed to collect information of hardware included in the apparatuses to be monitored. The interval of the event is different depending on a type of information to be obtained for the hardware, and there are an event whose execution interval is short and an event whose execution interval is long.

By the way, when the executions of the events concentrate at a specific timing in such a system, there is a case where a load caused by the executions of the events temporarily becomes extremely high. For example, a case is considered that one event whose execution interval is 1 second exists, 10 events whose execution interval is 10 seconds, and 100 events whose execution interval is 100 seconds. In such a case, at a timing when the events whose execution interval is 10 seconds and events whose execution interval is 100 seconds are not executed, only one event whose execution interval is 1 second is executed. However, 11 events are executed every 10 seconds, and 111 events are executed every 100 seconds. Therefore, the number of events executed increases extremely. Thus, when the executions of the events concentrate at a specific timing, a problem occurs that the execution of a portion of the events delays or the like.

Conventionally, as for a system for monitoring apparatuses, a following technique exists. Specifically, when there are a lot of rules, the concentration of collecting the hardware information at a specific timing is avoided by distributing polling in the system over a predetermined period of time. However, because, in this technique, the polling in the system is performed for each rule to collect the hardware information every time, there is a problem that the frequency of the processing becomes high, and the load of the system becomes high.

Patent Document 1: Japanese National Publication of International Patent Application No. 2007-519075

In other words, there is no technique to suppress the increase of the load caused by the executions of the events in case where plural events whose execution intervals are different are executed.

SUMMARY

An event management apparatus relating to this technique includes: (A) calculating, for each of plural execution intervals that are different each other, the number of events to be executed within a predetermined interval that is equal to or less than a shortest execution interval; (B) reading n data blocks at the predetermined intervals from a storage device that stores, for each of plural events, a data block, wherein the n is a total number of calculated numbers, the data block is used to execute a corresponding event, and each of the plural events has either of the plural execution intervals; and (C) outputting an execution request including the read data blocks to an execution unit that executes an event.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a diagram to explain a problem in a conventional technique;

FIG. 2 is a diagram to explain a problem in a conventional technique;

DESCRIPTION OF EMBODIMENTS

Figure 3:
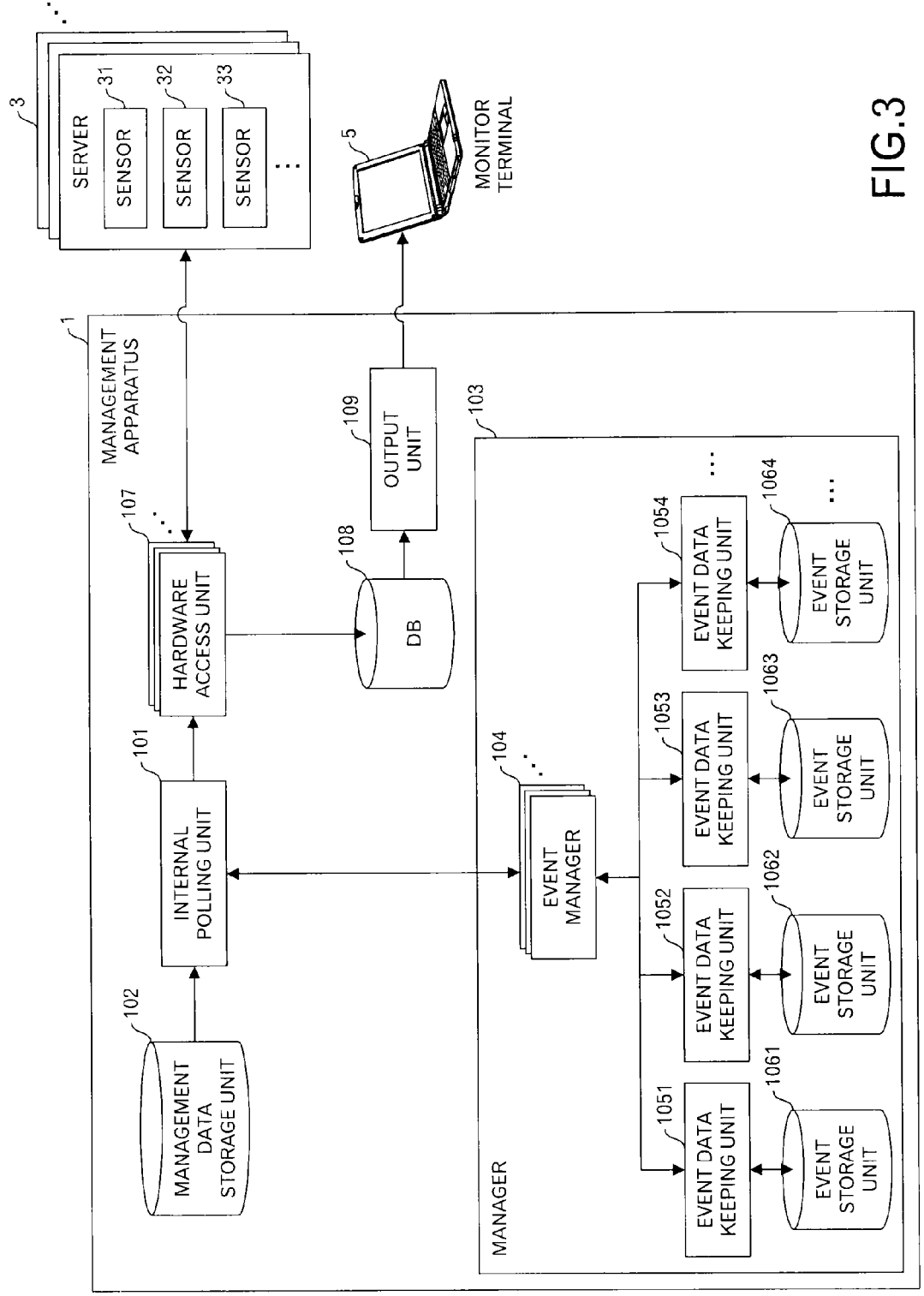
FIG. 3 is a diagram depicting a system outline of this embodiment.

As described in the column of the background, when the executions of the events concentrate at a specific timing, a problem that the executions of the events delay or the like occurs. A specific example is illustrated in FIG. 1. In FIG. 1, an event whose execution interval is 1 second and an event whose execution interval is 5 seconds are executed. A circle represents the execution of an event, and an axis is a time axis. In this example, a lot of events whose execution interval is 5 seconds are executed every 5 seconds. As a result, among the events whose execution interval is 5 seconds, events occur that are executed at a considerably late timing since an original timing at which the event should be executed. Moreover, because events with arrows among the events whose execution interval is 1 second are influenced by the events whose execution interval is 5 seconds, the timing at which the event is executed delays from some milli-seconds to some-hundred milli-seconds.

Then, as illustrated in FIG. 2, it is considered to avoid the concentration of the executions of the events at a specific timing by shifting the timing of the executions of the events. In order to execute the events as illustrated in FIG. 2, a following processing is executed. For example, when plural events whose execution interval is 1 second exist, a different offset value from 0 msec to 999 msec is assigned to each event. For example, when there are events 1 to 3 whose execution interval is 1 second, an offset value 100 msec is assigned to the event 1, an offset value 500 msec is assigned to the event 2, and an offset value 800 msec is assigned to the event 3. Then, the polling in the system is performed for every some milli-seconds since a reference time, and when an elapsed time since the reference time at the timing when the polling in the system is performed exceeds the offset value, the event to which that off set value is assigned is detected. When the elapsed time since the reference time reaches 1000 msec, that timing is set as a new reference time, and the aforementioned processing is repeated. Thus, it is possible to shift the timings when the events 1 to 3 are executed. Moreover, as for the events whose execution interval is 5 seconds, it is possible to shift the timings of the event executions by similarly assigning to an offset value from 0 msec to 4999 msec.

However, according to this method, the polling in the system is frequently performed, and there is a problem that the consumed amount of resources such as processors becomes large. Moreover, each time when one event is detected, a request is transmitted to a thread for executing the event or the like. Therefore, there is also a problem that the communication amount increases.

Then, in this embodiment, such problems are solved by a following method.

FIG. 3 illustrates a system outline in this embodiment. A management apparatus 1 and one or plural servers 3 are connected through a Local Area Network (LAN), for example. Moreover, the management apparatus 1 and a monitor terminal 5 are connected through the LAN, for example. The management apparatus 1 obtains hardware information from the servers 3, and provide the obtained information for the monitor terminal 5. The management apparatus 1 obtains the hardware information from the servers 3 through Intelligent Platform Management Interface (IPMI), for example. The monitor terminal 5 includes software for presenting the hardware information of the servers 3 to an operator.

The management apparatus 1 includes an internal polling unit 101, a management data storage unit 102, a manager 103 that has an event manager 104, event data keeping units 1051 to 1054 and event storage units 1061 to 1064, a hardware access unit 107, a database (DB) 108 and an output unit 109. In this embodiment, the number of the event managers 104 is the same as the number of servers 3. A combination of the event data keeping unit and event storage unit is provided for each execution interval. For example, when data of the event whose execution interval is 1 second is stored in the management data storage unit 102, one event data keeping unit and one event storage unit are provided for the event whose execution interval is 1 second. Moreover, for example, when data of the event whose execution interval is 5 seconds is stored in the management data storage unit 102, one event data keeping unit and one event storage unit are provided for the event whose execution interval is 5 seconds. Therefore, the number of combinations of the event data keeping unit and event storage unit is not limited to "4".

The internal polling unit 101 performs an internal polling processing for each predetermined time, and transmits a storage request including an execution data block of the extracted event to the manager 103. The event manager 104 distributes the execution data block of the event, which is received from the internal polling unit 101, to the event data keeping unit according to the execution interval of the event. The event data keeping units 1051 to 1054 read out the execution data blocks of the events to be executed from the event storage units 1061 to 1064, and transmits the read data to the event manager 104. The event manager 104 transmits the execution data block of the event to be executed to the internal polling unit 101. The internal polling unit 101 transmits an execution request including the execution data block of the event to be executed to the hardware access unit 107. The hardware access unit 107 executes the event by using the execution data block included in the execution request, obtains the hardware information from the servers 3, and stores the obtained data to the DB 108. The output unit 109 transmits the hardware information stored in the DB 108 to the monitor terminal 5 in response to a request from the monitor terminal 5 or periodically.

The server 3 includes sensors 31 to 33. The sensors 31 to 33 are sensors that obtain the hardware information of the server (e.g. supplied voltage from a power supply, a rotation rate of a cooling fan and the like), and are controlled by a Baseboard Management Controller (BMC), for example.

Figures 4, 5, 6:
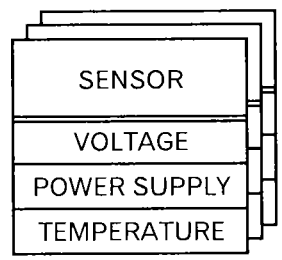
FIG. 4 is a diagram depicting an example of data stored in a server table.
FIG. 5 is a diagram depicting an example of data stored in an event table.
FIG. 6 is a diagram depicting an example of data stored in a sensor list.

FIG. 4 illustrates an example of a server table stored in the management data storage unit 102. An identifier of a server, data representing a state and an identifier of an event table are stored in the server table. "ON" represents that this is a server to be monitored, and "OFF" represents that this is a server not to be monitored. The identifier of the event table is an identifier of the event table that stores data of the event to be executed for the server.

FIG. 5 illustrates an example of the event table stored in the management data storage unit 102. A function name, a counter, an execution interval and an identifier of a sensor list are stored in the event table. The identifier of the sensor list is an identifier of a sensor list that stores items of the hardware information to be obtained by executing the event. The number of event tables to be prepared is equal to the number of identifiers of the event tables in the server table illustrated in FIG. 4. For example, the first event table among plural event tables illustrated in FIG. 5 is an example of an event table whose identifier is "1".

FIG. 6 illustrates an example of the sensor list stored in the management data storage unit 102. Items of the hardware information are stored in the sensor list. The number of sensor lists to be prepared is equal to the number of identifiers of the sensor lists in the event table illustrated in FIG. 5. For example, the first sensor list among plural sensor lists illustrated in FIG. 6 is an example of the sensor list whose identifier is "2".

Next, operations of the system illustrated in FIG. 3 will be explained by using FIGS. 7 to 21. Firstly, a processing performed by the internal polling unit 101 will be explained by using FIG. 7.

Figure 7:
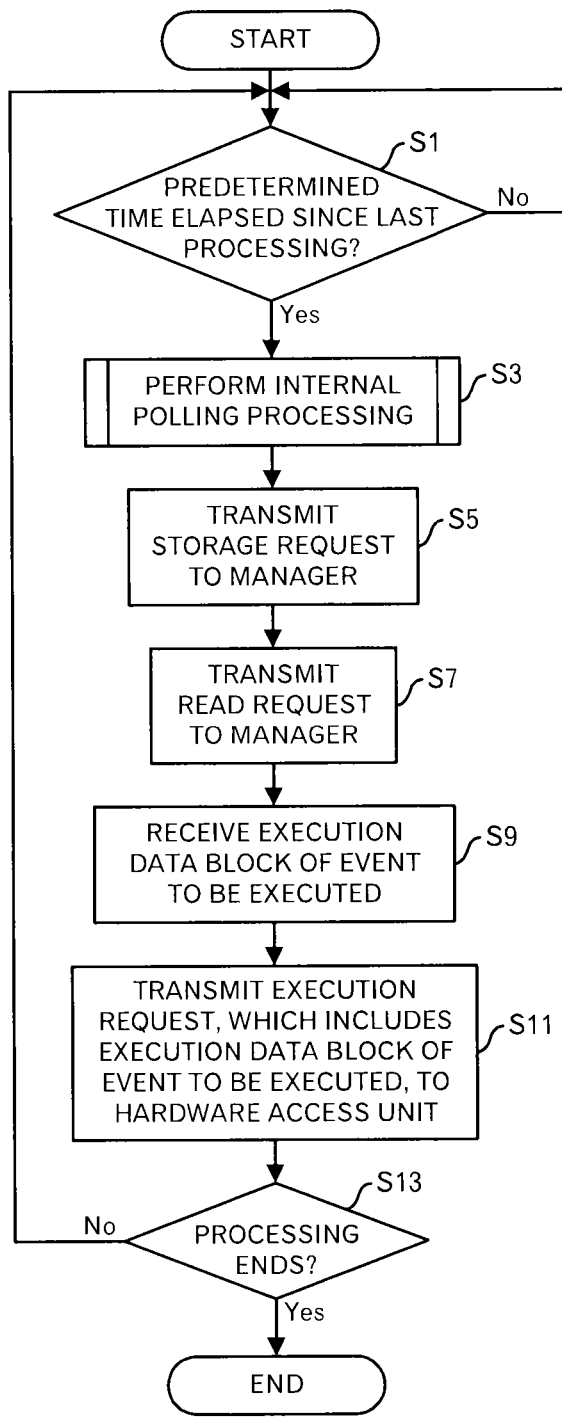
FIG. 7 is a diagram depicting a processing flow of a processing performed by an internal polling unit.

The internal polling unit 101 determines whether or not a predetermined period of time elapsed since the last processing (FIG. 7: step S1). In this embodiment, a value obtained by dividing the shortest execution interval among the execution intervals of the events, which are stored in the management data storage unit 102, by the number of servers 3 is employed as the predetermined period of time. For instance, in case where the shortest execution interval is 1 second and the number of servers 3 is "1", the internal polling unit 101 performs the processing every 1 second.

When the predetermined period of time does not elapse since the last processing (step S1: No route), the step S1 is repeated until the predetermined period of time elapsed. On the other hand, when the predetermined period of time elapsed (step S1: Yes route), the internal polling unit 101 performs an internal polling processing (step S3). The internal polling processing will be explained by using FIG. 8.

Figure 8:
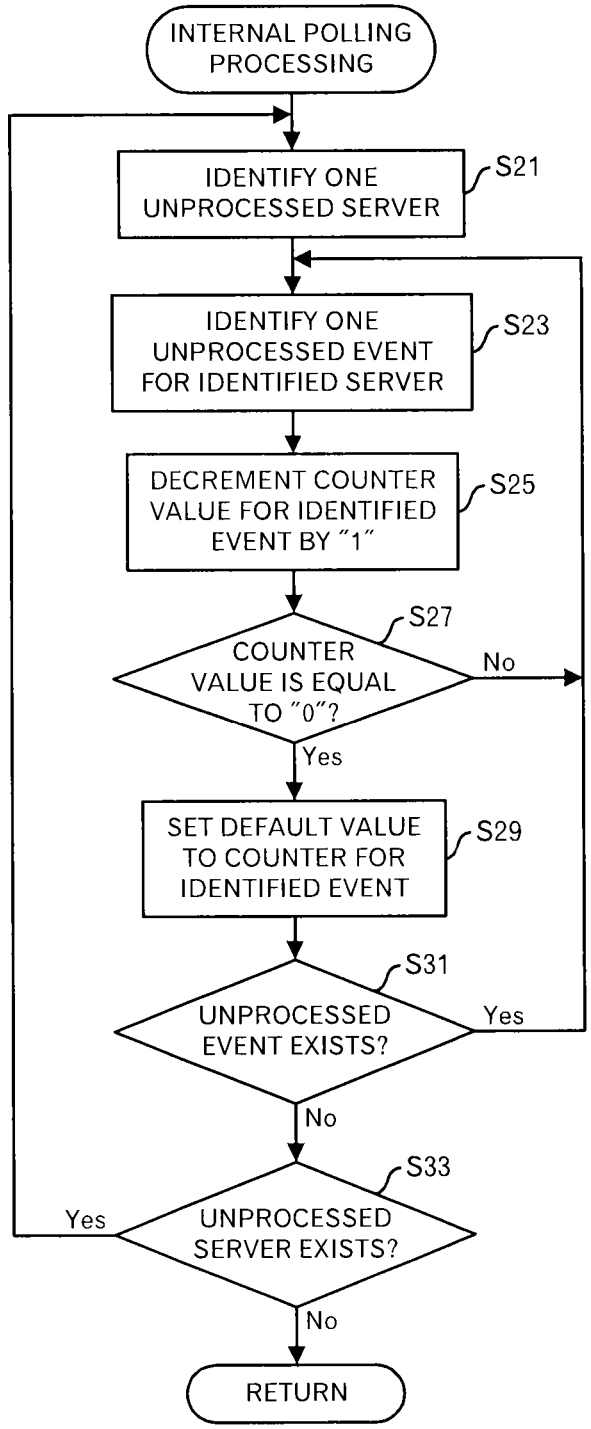
FIG. 8 is a diagram depicting a processing flow of an internal polling processing.

Firstly, the internal polling unit 101 identifies one unprocessed server among the servers whose state is "ON" from the server table (FIG. 4) stored in the management data storage unit 102 (FIG. 8: step S21). At the step S21, for example, an unprocessed server is identified from the top in sequence. Then, the internal polling unit 101 identifies one unprocessed event from the event table (FIG. 5) for the server identified at the step S21 (step S23).

The internal polling unit 101 decrements a value of the counter for the event identified at the step S23 in the event table (FIG. 5) by "1" (step S25). Then, the internal polling unit 101 determines whether or not the value of the counter becomes "0" (step S27).

When the value of the counter is not "0" (step S27: No route), the present time is not timing when the event is executed. Therefore, in order to process the next event, the processing returns to the processing of the step S23. On the other hand, when the value of the counter becomes "0" (step S27: Yes route), the internal polling unit 101 extracts the execution data block of the event identified at the step S23 and the execution interval from the management data storage unit 102. The execution data block includes the identifier of the server, which is stored in the server table (FIG. 4), the function name stored in the event table (FIG. 5) and information of the sensors stored in the sensor list (FIG. 6). Then, the internal polling unit 101 sets a default value as the value of the counter for the event identified at the step S23 (step S29). The default value is a value obtained by dividing the execution interval of the event by the shortest execution interval.

The internal polling unit 101 determines whether or not there is an unprocessed event for the server identified at the step S21 (step S31). When there is an unprocessed event (step S31: Yes route), the processing returns to the processing of the step S23 in order to process the next event.

On the other hand, when there is no unprocessed event (step S31: No route), the internal polling unit 101 determines whether or not there is an unprocessed server (step S33). When there is an unprocessed server (step S33: Yes route), the processing returns to the processing of the step S21 in order to process the next server. When there is no unprocessed server (step S33: No route), the processing returns to a calling-source processing.

By performing the aforementioned processing, even when there are plural events whose execution intervals are different, it becomes possible to appropriately detect events to be executed at this timing.

Returning to the explanation of FIG. 7, the internal polling unit 101 transmits a storage request including the execution data block and execution interval of the event for which the value of the counter is determined at the step S27 to be "0" (step S5). Moreover, the internal polling unit 101 transmits a read request to request to read out the execution data block of the event to be executed from the event storage units 1061 to 1064 (step S7).

The internal polling unit 101 receives the execution data block of the event to be executed from the manager 103 that performed a processing in response to the read request transmitted at the step S7 (step S9). Then, the internal polling unit 101 transmits an execution request including the execution data block of the event to be executed to the hardware access unit 107 (step S11).

Then, when an end of the processing is not instructed to the internal polling unit 101 (step S13: No route), the processing returns to the processing of the step S1 in order to continue the processing. On the other hand, when the end of the processing is instructed (step S13: Yes route), the processing ends.

As described above, the event to be executed is detected at intervals determined based on the shortest execution interval, and the execution request is transmitted to the hardware access unit 107. Thus, compared with a case where the processing is performed each time when the individual event is detected, the frequency of the internal polling processing is decreased, and the number of times of the transmission of the execution request to the hardware access unit 107 is also decreased. Then, the processing load is reduced.

Figure 9:
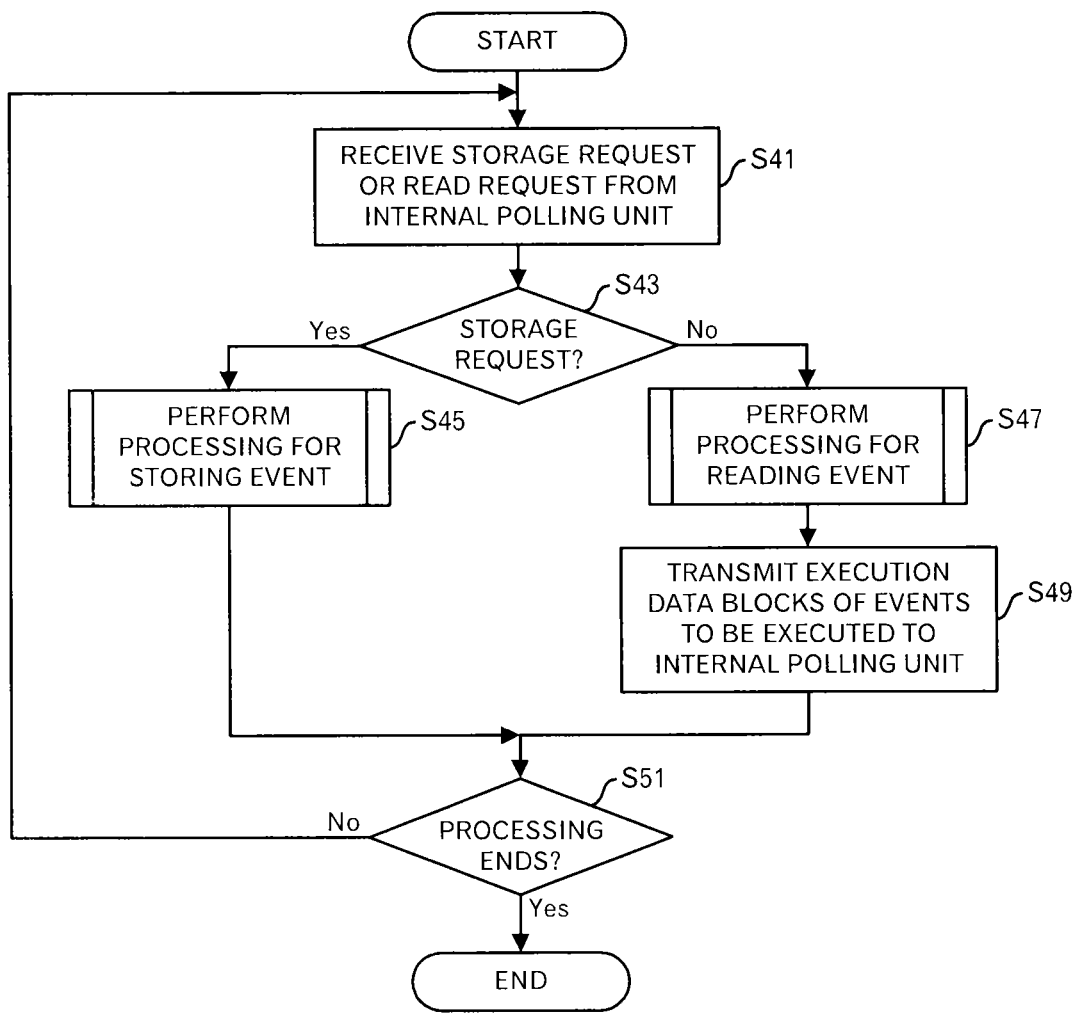
FIG. 9 is a diagram depicting a processing flow of a processing performed by a manager.

Next, a processing executed by the manager 103 will be explained by using FIG. 9. Firstly, the event manager 104 receives the aforementioned storage request or read request from the internal polling unit 101 (FIG. 9: step S41). Then, the event manager 104 determines whether or not the storage request was received at the step S41 (step S43).

When the storage request was received (step S43: Yes route), the event manager 104 and the event data keeping units 1051 to 1054 perform a processing for storing an event (step S45). This processing will be explained by using FIG. 10.

Figures 10, 11:
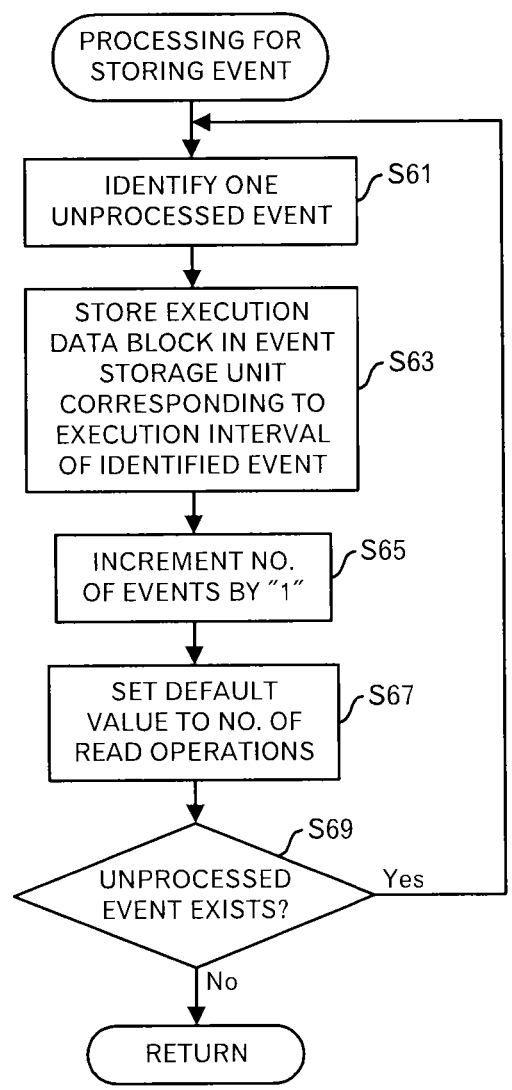
FIG. 10 is a diagram depicting a processing flow of a processing for storing an event.
FIG. 11 is a diagram depicting an example of management data managed by an event data keeping unit.

Firstly, the event manager 104 identifies one unprocessed event among the events whose execution data block is included in the storage request (FIG. 10: step S61). Then, the event manager 104 transmits the execution data block of the event identified at the step S61 to the event data keeping unit that corresponds to the execution interval of that event (here, it is assumed that the event data keeping unit 1051 is identified). Then, the event data keeping unit 1051 stores the received execution data block into the event storage unit 1061 (step S63).

The event data keeping unit 1051 increments "the number of events" by "1" in the management data managed by the event data keeping unit 1051 (step S65). FIG. 11 illustrates an example of the management data managed by the event data keeping unit 1051. The event data keeping unit 1051 manages the execution interval of the event, the number of events, and the number of read operations. The number of events is the number of execution data blocks stored in the event storage unit 1061. Then, the event data keeping unit 1051 sets a default value to the number of read operations (step S67). The default value is a value obtained by dividing the execution interval of the event by the shortest execution interval.

Then, the event manager 104 determines whether or not there is an unprocessed event (step S69). When there is an unprocessed event (step S69: Yes route), the processing returns to the processing of the step S61 in order to process the next event. On the other hand, when there is no unprocessed event (step S69: No route), the processing returns to the calling-source processing.

By carrying out the aforementioned processing, the execution data block of the event to be executed can be temporarily stored.

Returning to the explanation of FIG. 9, when it is determined at the step S43 that the storage request is not received (step S43: No route), it is determined that the read request was received. Therefore, the event manager 104 and event data keeping units 1051 to 1054 perform a processing for reading an event (step S47). The processing for reading the event will be explained by using FIG. 12.

Figure 12:
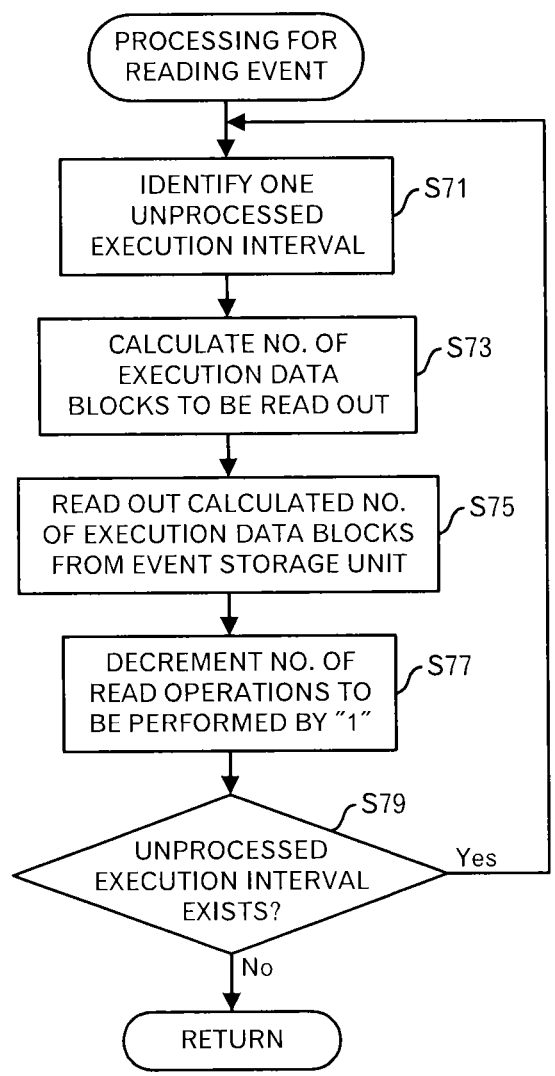
FIG. 12 is a diagram depicting a processing flow of a processing for reading an event.

Firstly, the event manager 104 identifies one unprocessed execution interval among the execution intervals managed in the manager 103 (FIG. 12: step S71). Then, the event manager 104 notifies the event data keeping unit corresponding to the identified execution interval (here, it is assumed that the event data keeping unit 1051 is identified.) that the read request was received.

The event data keeping unit 1051 calculates the number of execution data blocks that are read from the event storage unit 1061 by Int((the number of events)*(the number of read operations)/(the execution interval)*(shortest execution interval))−Int((the number of events)*(the number of read operations−1)/(the execution interval)*(shortest execution interval)) (step S73). Here, Int(x) is a function to calculate an integer part of x.

In the mathematical expression used at the step S73, (the number of events)/(the execution interval)*(the shortest execution interval) represents the number of execution data blocks to be read once in case where the execution data blocks stored in the event storage unit are read out in one execution interval without exception. Even when reading out the execution data blocks of the number corresponding to an integer part of (the number of events)/(the execution interval)*(the shortest execution interval), the number of events to be executed is equalized to some degree. However, by using the mathematical expression used at the step S73, the dispersion of the number of events to be executed further becomes lesser. In the following, a specific example will be explained.

Firstly, a case is considered that there are 7 events whose execution interval is 5 seconds and the shortest execution interval is 1 second. In such a case, (the number of events)/(the execution interval)*(the shortest execution interval)=7/5*1=1.4. Therefore, 1.4 execution data blocks are read out once.

Then, by simply using a method to discard numbers of "1.4" after the decimal point (hereinafter, referred to a first method), one event is executed per one second. Therefore, the numbers of events to be executed are "1, 1, 1, 1, 3". Moreover, by simply using a method to round up numbers of "1.4" after the decimal point (hereinafter, referred to a second method), two events are executed per one second. Therefore, the numbers of events to be executed are "2, 2, 2, 1, 0". In either method, a difference between the maximum value and the minimum value of the number of events to be executed is "2".

On the other hand, when applying the mathematical expression used at the step S73 to the same case, the numbers of events to be executed are "2, 1, 2, 1, 1". When the mathematical expression used at the step S73 is applied, the difference between the maximum value and the minimum value of the number of events to be executed is "1", and is less than the difference of the aforementioned two methods, and is further preferable, because the dispersion of the numbers of events to be executed becomes lesser.

Figures 13, 14:
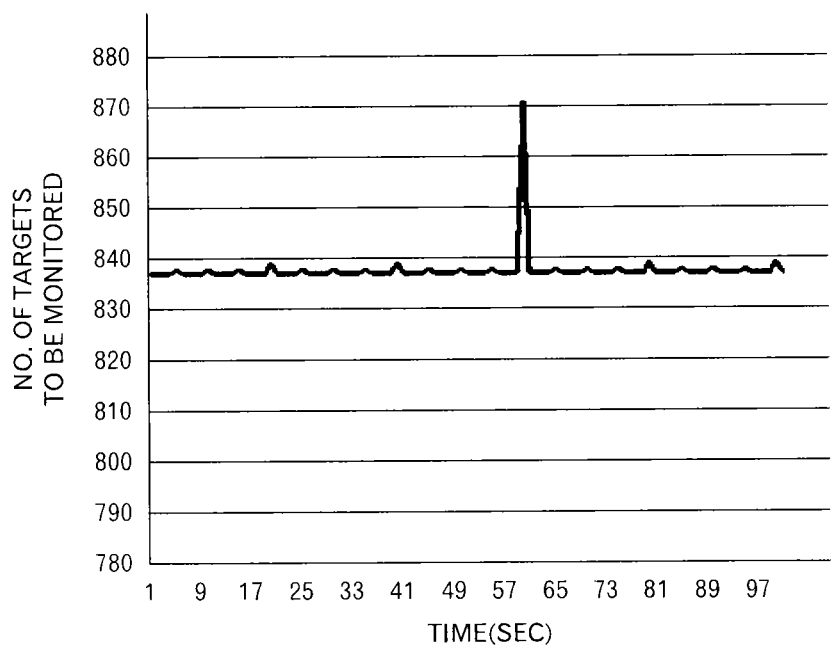
FIG. 13 is a diagram depicting an example of the number of targets to be monitored for each execution interval.
FIG. 14 is a diagram depicting change of the number of targets to be monitored in case where a method for discarding numbers after the decimal point is employed.

Moreover, a case is considered where there are targets to be monitored as illustrated in FIG. 13. The targets to be monitored are targets from which the hardware access unit 107 obtains the hardware information. In the case illustrated in FIG. 13, there are 7302 targets to be monitored, and in order to obtain the hardware information without any delay, the hardware information is obtained from 840 targets to be monitored per one second.

FIG. 14 illustrates change of the number of targets to be monitored in case where the first method is applied to the case illustrated in FIG. 13. In FIG. 14, the vertical axis represents the number of targets to be monitored, and the horizontal axis represents a time course from a predetermined reference time. In FIG. 14, the number of targets to be monitored stably changes during almost all time bands under 840, however, the number of targets to be monitored increases to about 870 when the time course reaches 60 seconds. Thus, the dispersion of the number of targets to be monitored becomes large when the first method is employed.

Figure 15:
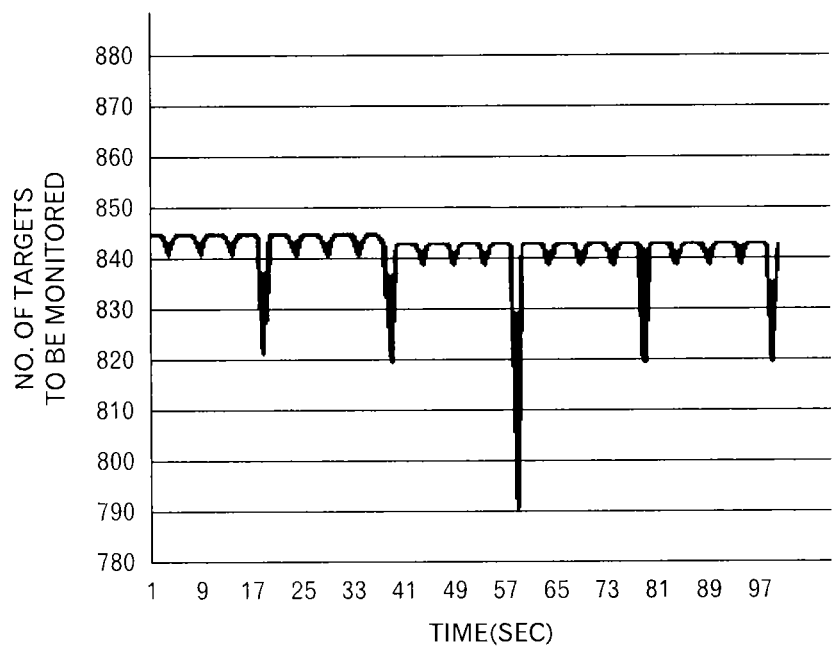
FIG. 15 is a diagram depicting change of the number of targets to be monitored in case where a method for rounding up numbers after the decimal point is employed.

FIG. 15 illustrates change of the number of targets to be monitored incase where the second method is applied to the case illustrated in FIG. 13. The format of FIG. 15 is the same as that of FIG. 14. In FIG. 15, the number of targets to be monitored changes between about 840 and about 845 during almost all time bands, however, the number of targets to be monitored decreases to about 820 per 20 seconds, and also changes to about 790 when the time course reaches 60 seconds. Thus, when the second method is employed, the dispersion of the number of targets to be monitored becomes large.

Figure 16:
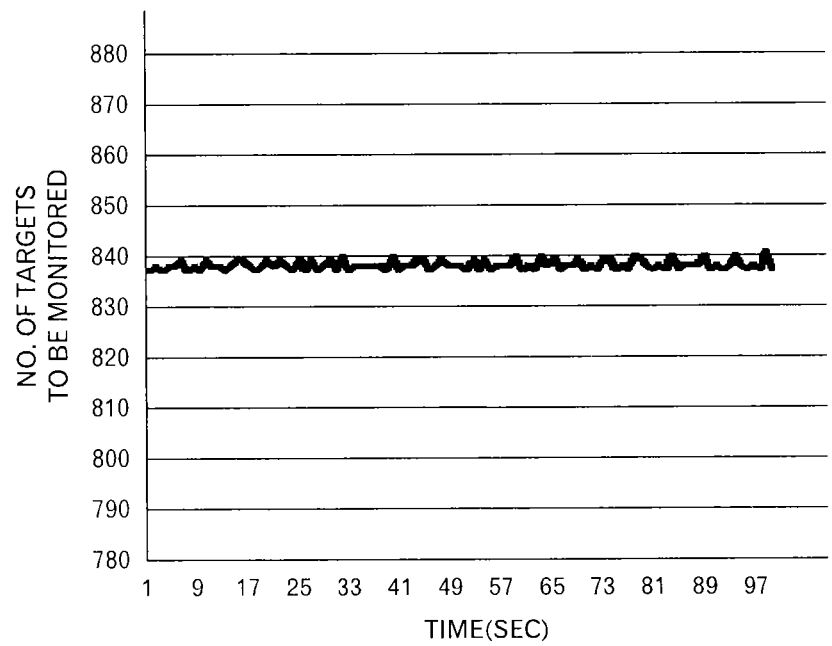
FIG. 16 is a diagram depicting change of the number of targets to be monitored in case where a mathematical expression in this embodiment is employed.

FIG. 16 illustrates change of the number of targets to be monitored in case where this embodiment is applied to the case illustrated in FIG. 13. The format of FIG. 16 is the same as those of FIG. 14 and FIG. 15. In FIG. 16, the number of targets to be monitored is always about 840, and the dispersion of the number of targets to be monitored becomes small, compared with the first and second methods. By considering the aforementioned matters, the aforementioned mathematical expression is employed in this embodiment.

Returning to the explanation of FIG. 12, the event data keeping unit 1051 reads out the execution data blocks of the number calculated at the step S73 from the event storage unit 1061 (step S75). The order of reading out the execution data blocks from the event storage unit 1061 is determined, for example, according to the first-in-first-out. Then, the event data keeping unit 1051 decreases the number of read operations in the management data managed by the event data keeping unit 1051 by "1" (step S77).

The event manager 104 determines whether or not there is an unprocessed execution interval among the execution intervals managed by the manager 103 (step S79). When there is an unprocessed execution interval (step S79: Yes route), the processing returns to the processing of the step S71. On the other hand, when there is no unprocessed execution interval (step S79: No route), the processing returns to the calling-source processing.

Returning to the explanation of FIG. 9, the event manager 104 transmits the execution data blocks of the events to be executed, which were read out from the event storage unit at the step S75, to the internal polling unit 101 (step S49). Then, the event manager 104 determines whether or not an end instruction of the processing was received (step S51). When the end instruction of the processing is not received (step S51: No route), the processing returns to the processing of the step S41, and when the end instruction of the processing was received (step S51: Yes route), the processing ends.

By performing the aforementioned processing, it is possible to suppress the increase of the load caused by the concentration of the executions of the events at a specific timing, even if plural events whose execution intervals are different are executed.

Next, a processing performed by the hardware access unit 107 will be explained by using FIGS. 17 and 18.

Figures 17, 18:
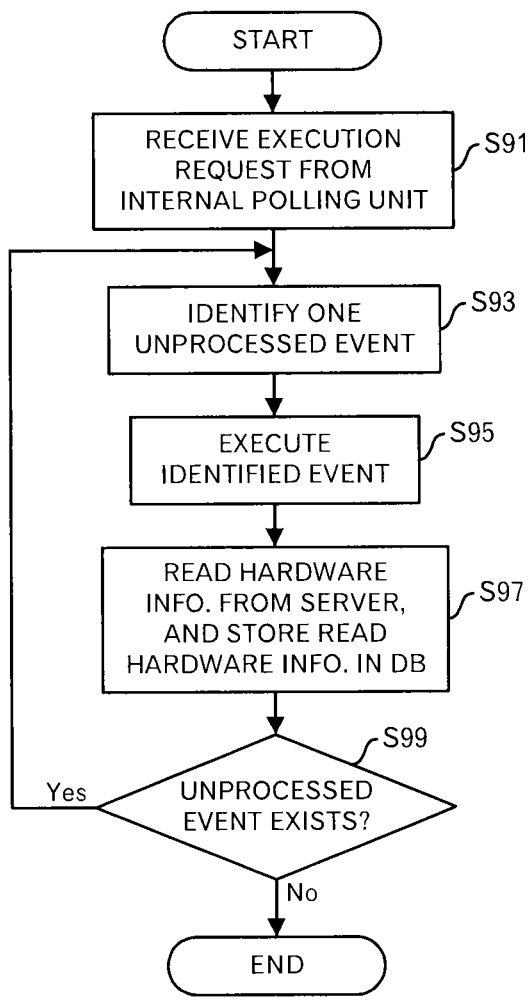
FIG. 17 is a diagram depicting a processing flow of a processing performed by a hardware access unit.
FIG. 18 is a diagram depicting an example of data stored in a DB.

Firstly, the hardware access unit 107 receives an execution request from the internal polling unit 101 (FIG. 17: step S91). Then, the hardware access unit 107 identifies one unprocessed event among the events whose execution data blocks are included in the execution request (step S93).

The hardware access unit 107 executes the event by using the function name, the identifier of the server and sensor information, which are included in the execution data block of the identified event (step S95). Specifically, the hardware access unit 107 transmits a read request of the hardware information to the server 3. On the other hand, the sensors 31 to 33 in the server 3 transmit the hardware information to the management apparatus 1 in response to the read request from the hardware access unit 107.

When the hardware access unit 107 obtains the hardware information from the server 3, the hardware access unit 107 stores the obtained information into the DB 108 (step S97). FIG. 18 illustrates an example of data stored in the DB 108. In an example of FIG. 18, the hardware information of plural items is stored for each server.

Then, the hardware access unit 107 determines whether or not there is an unprocessed event (step S99). When there is an unprocessed event (step S99: Yes route), the processing returns to the processing of the step S93 in order to process the next event. On the other hand, when there is no unprocessed event (step S99: No route), the processing ends.

By carrying out the aforementioned processing, it is possible to store the hardware information into the DB 108, and present the hardware information to the operator of the monitor terminal 5.

Figure 19:
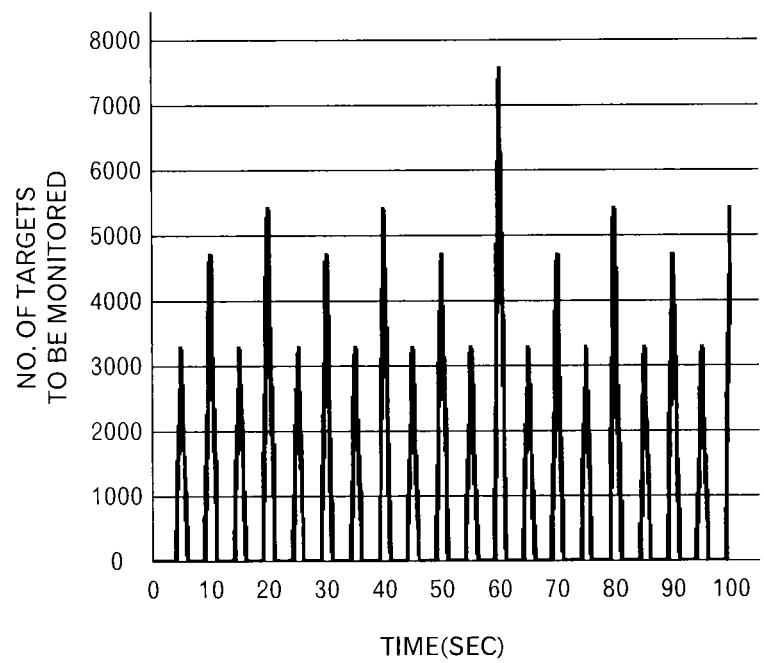
FIG. 19 is a diagram depicting change of the number of targets to be monitored in case where this embodiment is not applied.

For example, for the case illustrated in FIG. 13, the change of the number of targets to be monitored in case where this embodiment is not applied is illustrated in FIG. 19. Specifically, the change of the number of targets to be monitored is illustrated in case where the aforementioned manager 103 is not provided, the internal polling unit 101 performs the internal polling processing every 1 second, and the execution request is transmitted to the hardware access unit 107 every time when the event is detected. The format of FIG. 19 is the same as those of FIGS. 14 and 15. In FIG. 19, the number of targets to be monitored becomes equal to or greater than 3000 per 5 seconds, 4000 per 10 seconds, 5000 per 20 seconds and 7000 per 60 seconds. This is because the executions of the events whose execution intervals are different concentrate at these timings, and as a result, the difference between the maximum number of targets to be monitored and the minimum number of targets to be monitored is equal to or greater than 7000.

Figure 20:
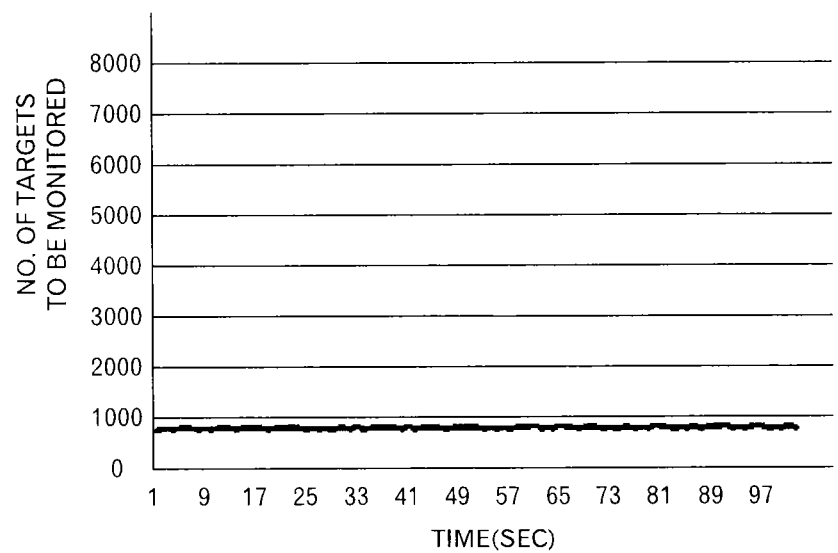
FIG. 20 is a diagram depicting change of the number of targets to be monitored in case where this embodiment is applied.

On the other hand, for the case illustrated in FIG. 13, the change of the number of targets to be monitored in case where this embodiment is applied is as illustrated in FIG. 20. The format of FIG. 20 is the same as that of FIG. 19. In FIG. 20, the number of targets to be monitored changes around about 840, always. In other words, the number of events to be executed is made to be flat. Therefore, the load of the hardware access unit 107 is stable, and the problem such as the executions of the events delay cannot be caused.

Figure 21:
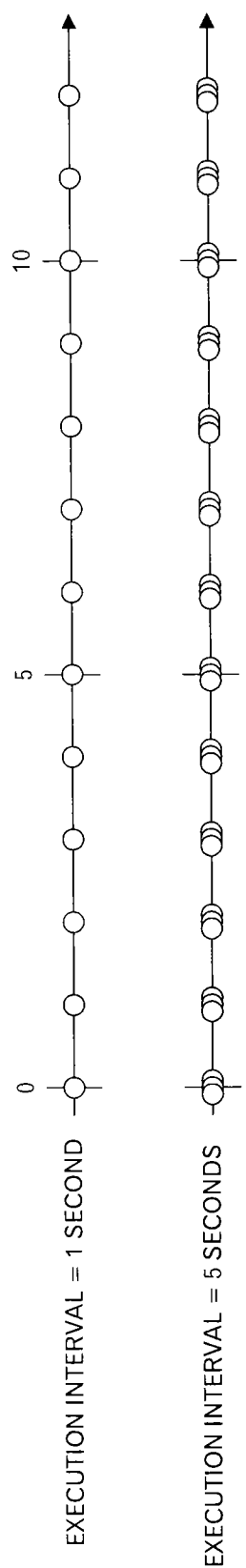
FIG. 21 is a diagram depicting an event execution method in this embodiment.

Moreover, the method for executing the events in this embodiment will be explained by using FIG. 21. The format of FIG. 21 is the same as those of FIGS. 1 and 2, and the conditions such as the number of events to be executed are the same as those of FIGS. 1 and 2. However, the shortest execution interval is 1 second, and the number of servers is "1". Therefore, the interval of the processing is 1 second. Compared with FIG. 1, the event whose execution interval is 5 seconds is executed every 1 second piece by piece, and the delay of the event execution is suppressed. Moreover, because the event is not executed every time when the individual event is detected as illustrated in FIG. 2, the frequency of the polling in the system becomes low, and the number of execution requests transmitted to the hardware access unit 107 is decreased. Accordingly, the high load of the management apparatus 1 is prevented.

Although one embodiment of this technique was explained, this technique is not limited to the embodiment. For example, the configuration of the aforementioned management apparatus 1 does not always correspond to an actual program module configuration.

Moreover, as for the aforementioned processing flows, as long as the processing results do not change, the turns of the processing may be exchanged, and the steps may be executed in parallel.

In addition, in the aforementioned example, the management apparatus 1 is separated from the server 3, however, a system may be employed in which the management apparatus 1 obtains the hardware information in the management apparatus 1, for example, by I²C (Inter-Integrated Circuit).

Figure 22:
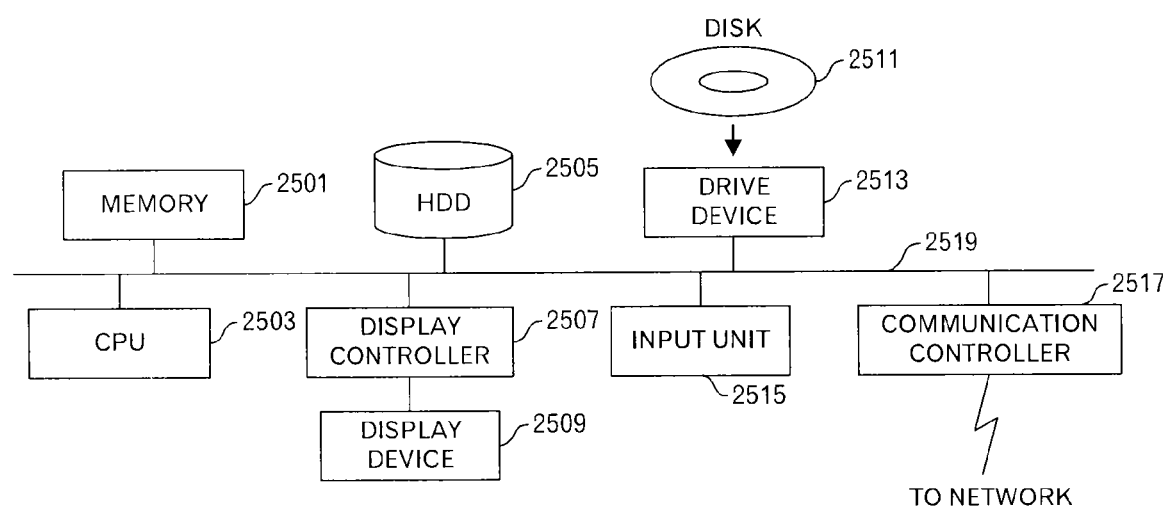
FIG. 22 is a functional block diagram of a computer.

In addition, the aforementioned management apparatus 1, servers 3 and monitor terminal 5 are computer devices as illustrated in FIG. 22. That is, a memory 2501 (storage device), a CPU 2503 (processor), a hard disk drive (HDD) 2505, a display controller 2507 connected to a display device 2509, a drive device 2513 for a removable disk 2511 an input unit 2515, and a communication controller 2517 for connection with a network are connected through a bus 2519 as illustrated in FIG. 22. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the application programs systematically cooperate with each other, so that various functions as described above in details are realized.

The aforementioned embodiments are outlined as follows:

An event management apparatus relating to a first aspect of the embodiments includes: (A) an event storage unit that stores, for each of plural events, a data block used to execute the event, wherein the event has either of plural execution intervals that are different each other; (B) a reading unit that calculates, for each of the plural execution intervals, the number of events to be executed within a predetermined interval that is equal to or less than a shortest execution interval, and collectively reads n data blocks at the predetermined intervals from the event storage unit, wherein "n" is a total number of the calculated numbers; and (C) an output unit that outputs an execution request including the read data blocks to an execution unit that executes an event.

In case where the plural events that have either of plural different execution intervals are executed, the frequency of the processing may become high and the processing load may increase, when a method for outputting an execution request each time when one event to be executed is detected is employed. Then, as described above, by collectively process the data blocks for each execution interval, the increase of the processing load can be suppressed.

An event management apparatus relating to a second aspect of the embodiments includes: (D) plural event storage units that stores data blocks, each of which is used to execute an event; (E) a storage processing unit that obtains data blocks of events to be executed and execution intervals of the events to be executed, and stores a data block of an event to be executed in an event storage unit for storing the data block of the event whose execution interval is the same as that of the event to be executed, among the plural event storage units; (F) a reading unit that calculates, for each of the plural event storage units, the number of data blocks to be read out from the event storage unit at intervals that are equal to or less than a shortest execution interval among the plural execution intervals, by using a first value calculated by multiplying the number of data blocks stored in the event storage unit and a value calculated by dividing the shortest execution interval by the execution interval of the event that is executed by using the data blocks stored in the event storage unit, and reads out data blocks of the calculated number from the event storage unit; and (G) an output unit that outputs an execution request including the read data blocks by the reading unit to an execution unit that executes the events.

By performing the aforementioned processing, even if plural events, each of which has either of intervals, are executed, it becomes possible to suppress the increase of the load caused by the concentration of the executions of the events at a specific timing. Moreover, it is possible to process events of the number calculated by the reading unit once. Therefore, compared with a case where the processing is performed each time when the individual event is obtained, the frequency of the processing can be decreased, and the load can be reduced.

Moreover, this event management apparatus may further include: (H) a data storage unit that stores, for each event, an execution interval of the event, management data for managing an execution timing of the event, and a data block used to execute the event. Then, (g1) the aforementioned output unit may use the management data stored in the data storage unit to detect an event to be executed, and output the data block of the event to be executed and the execution interval of the event to be executed to the storage processing unit. Thus, a processing for the event for the execution timing can be conducted.

Moreover, the aforementioned reading unit may (f1) calculate a second value by subtracting the number of times that data blocks are read from the event storage unit after finally storing data blocks into the event storage unit from a value calculated by dividing the execution interval of the event to be executed by using the data block stored in the event storage unit by the shortest execution interval, and read out, from the event storage unit, n data blocks. "n" is a number calculated by subtracting an integer part of (the first value*(the second value−1)) from an integer part of (the first value*the second value). Thus, the dispersion of the number of events to be executed becomes small, and the load caused by the executions of the events becomes stable.

Moreover, the aforementioned event may be an event to obtain hardware information of one or plural computers, and the aforementioned reading unit and output unit may (f2, g2) perform a processing at the predetermined interval that is an interval calculated by dividing the shortest execution interval by the number of computers. When the number of computers increases, it is considered that the number of events increases according to the increase of the number of computers. Then, by determining the interval of the processing according to the number of computers, the executions of the events can be performed, appropriately.

An information processing method relating to a third aspect of this embodiments includes: (I) upon obtaining a data block of an event to be executed and an execution interval of the event to be executed, storing a data block of an event to be executed in an event storage unit for storing the data block of the event whose execution interval is the same as that of the event to be executed, among plural event storage units storing data blocks used for the executions of the events; (J) calculating, for each of the plural event storage units, the number of data blocks to be read out from the event storage unit at intervals that are equal to or less than a shortest execution interval among the plural execution intervals, by using a first value calculated by multiplying the number of data blocks stored in the event storage unit and a value calculated by dividing the shortest execution interval by the execution interval of the event that is executed by using the data blocks stored in the event storage unit and reading out data blocks of the calculated number from the event storage unit; and (K) outputting an execution request including the read data blocks by the reading unit to an execution unit that executes the events.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An event management apparatus, comprising:
a memory; and
a processor configured to use the memory and execute a process, the process comprising:
first calculating, for each of a plurality of execution intervals that are different from each other, a first value that represents a number of events to be executed within a predetermined interval that is equal to or less than a shortest execution interval of the plurality of execution intervals;
second calculating, for each of the plurality of execution intervals, a second value by subtracting a number of times that data blocks are obtained from a storage device after finally storing data blocks into the storage device from a third value calculated by dividing the execution interval by the shortest execution interval, wherein the storage device stores data blocks used for execution of events;

third calculating, for each of the plurality of execution intervals, a number of data blocks to be obtained from the storage device based on a fourth value calculated by subtracting an integer part of (a fifth value calculated by dividing the first value by the execution interval*(the second value−1)) from an integer part of (the fifth value*the second value);

obtaining, for each of the plurality of execution intervals, n data blocks at the predetermined intervals from the storage device, wherein the n is the calculated number for the execution interval; and outputting an execution request including the obtained data blocks to an execution unit that executes events.

2. The event management apparatus as set forth in claim 1, wherein the event is an event to obtain hardware information of one or a plurality of computers, and the predetermined interval is an interval calculated by dividing the shortest execution interval by a number of computers.

3. An event management method, comprising:

first calculating, by using a computer and for each of a plurality of execution intervals that are different from each other, a first value that represents a number of events to be executed within a predetermined interval that is equal to or less than a shortest execution interval of the plurality of execution intervals;

second calculating, by using the computer and for each of the plurality of execution intervals, a second value by subtracting a number of times that data blocks are obtained from a storage device after finally storing data blocks into the storage device from a third value calculated by dividing the execution interval by the shortest execution interval, wherein the storage device stores data blocks used for execution of events;

third calculating, by using the computer and for each of the plurality of execution intervals, a number of data blocks to be obtained from the storage device based on a fourth value calculated by subtracting an integer part of (a fifth value calculated by dividing the first value by the execution interval*(the second value−1)) from an integer part of (the fifth value*the second value);

obtaining, by using the computer and for each of the plurality of execution intervals, n data blocks at the predetermined intervals from the storage device that stores, wherein the n is the calculated number for the execution interval; and outputting, by using the computer, an execution request including the obtained data blocks to an execution unit that executes events.

4. A non-transitory computer-readable storage medium storing a program for causing a computer to execute a process, the process comprising:

first calculating, for each of a plurality of execution intervals that are different from each other, a first value that represents a number of events to be executed within a predetermined interval that is equal to or less than a shortest execution interval of the plurality of execution intervals;

second calculating, for each of the plurality of execution intervals, a second value by subtracting a number of times that data blocks are obtained from a storage device after finally storing data blocks into the storage device from a third value calculated by dividing the execution interval by the shortest execution interval, wherein the storage device stores data blocks used for execution of events;

third calculating, for each of the plurality of execution intervals, a number of data blocks to be obtained from the storage device based on a fourth value calculated by subtracting an integer part of (a fifth value calculated by dividing the first value by the execution interval*(the second value−1)) from an integer part of (the fifth value*the second value);

obtaining, for each of the plurality of execution intervals, n data blocks at the predetermined intervals from the storage device, wherein the n is the calculated number for the execution interval; and outputting an execution request including the obtained data blocks to an execution unit that executes events.

* * * * *